United States Patent [19]

Plegat

[11] 3,942,703

[45] Mar. 9, 1976

[54] MACHINE FOR THE SUCCESSIVE WELDING OF TWO HEADER BOXES IN THE TWO END PLATES OF RADIATORS

[75] Inventor: Alain Edouard Plegat, Asnieres, France

[73] Assignee: Societe Anonyme des Usines Chausson, Asnieres, France

[22] Filed: Dec. 9, 1974

[21] Appl. No.: 531,100

[30] Foreign Application Priority Data
Jan. 15, 1974 France .............................. 74.01325

[52] U.S. Cl. ................ 228/41; 228/44.1 R; 228/47
[51] Int. Cl.² ...................... B23K 1/04; B23K 37/04
[58] Field of Search ................ 228/44, 47, 44.1, 41; 29/202 R; 269/58, 59, 61; 432/231

[56] References Cited
UNITED STATES PATENTS

| | | | |
|---|---|---|---|
| 2,656,155 | 10/1953 | Garratt | 29/157.3 R |
| 3,149,825 | 9/1964 | Watkins | 432/231 |
| 3,318,503 | 5/1967 | Plegat | 228/47 X |

FOREIGN PATENTS OR APPLICATIONS

| | | | |
|---|---|---|---|
| 831,689 | 3/1960 | United Kingdom | 228/47 |
| 1,156,579 | 12/1957 | France | 29/202 R |
| 621,718 | 6/1961 | Italy | 228/47 |
| 1,219,386 | 12/1959 | France | 228/47 |

Primary Examiner—Al Lawrence Smith
Assistant Examiner—K. J. Ramsey
Attorney, Agent, or Firm—Browdy and Neimark

[57] ABSTRACT

The machine comprises a frame, a rotating gripper supported by the frame and comprising two arms provided with removable bearing plates for the end-plates of a radiator, pressing means maintaining the header boxes of the radiator on the end plates, and two heating units adjustably mounted on parallel shafts for the welding of these two parts.

14 Claims, 11 Drawing Figures

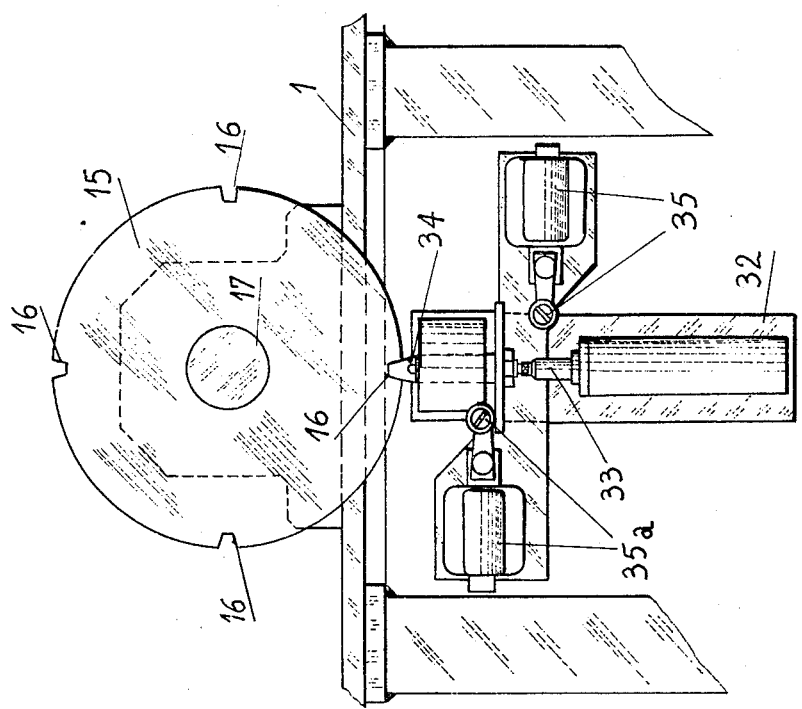
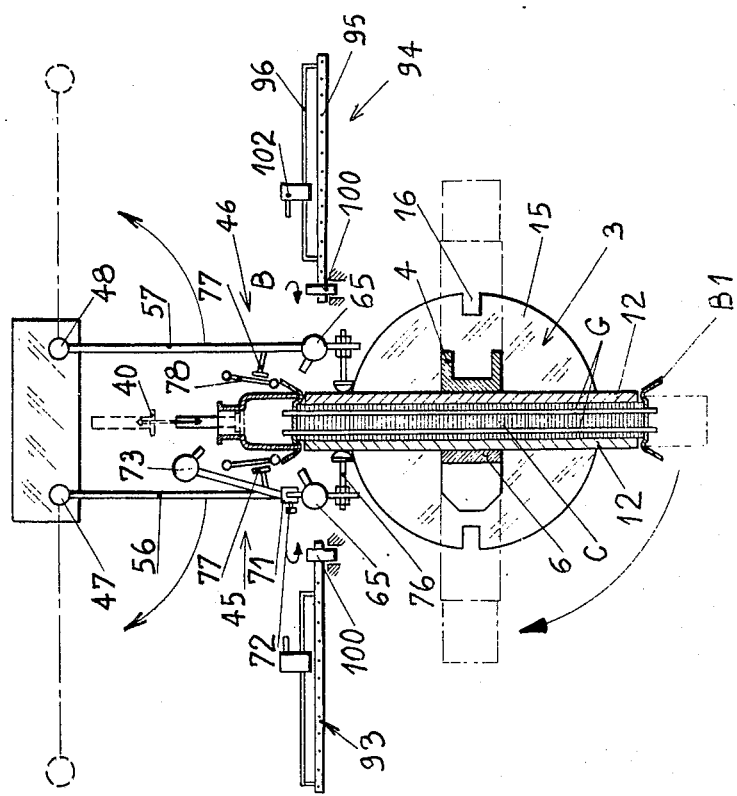
Fig.3
Fig.2

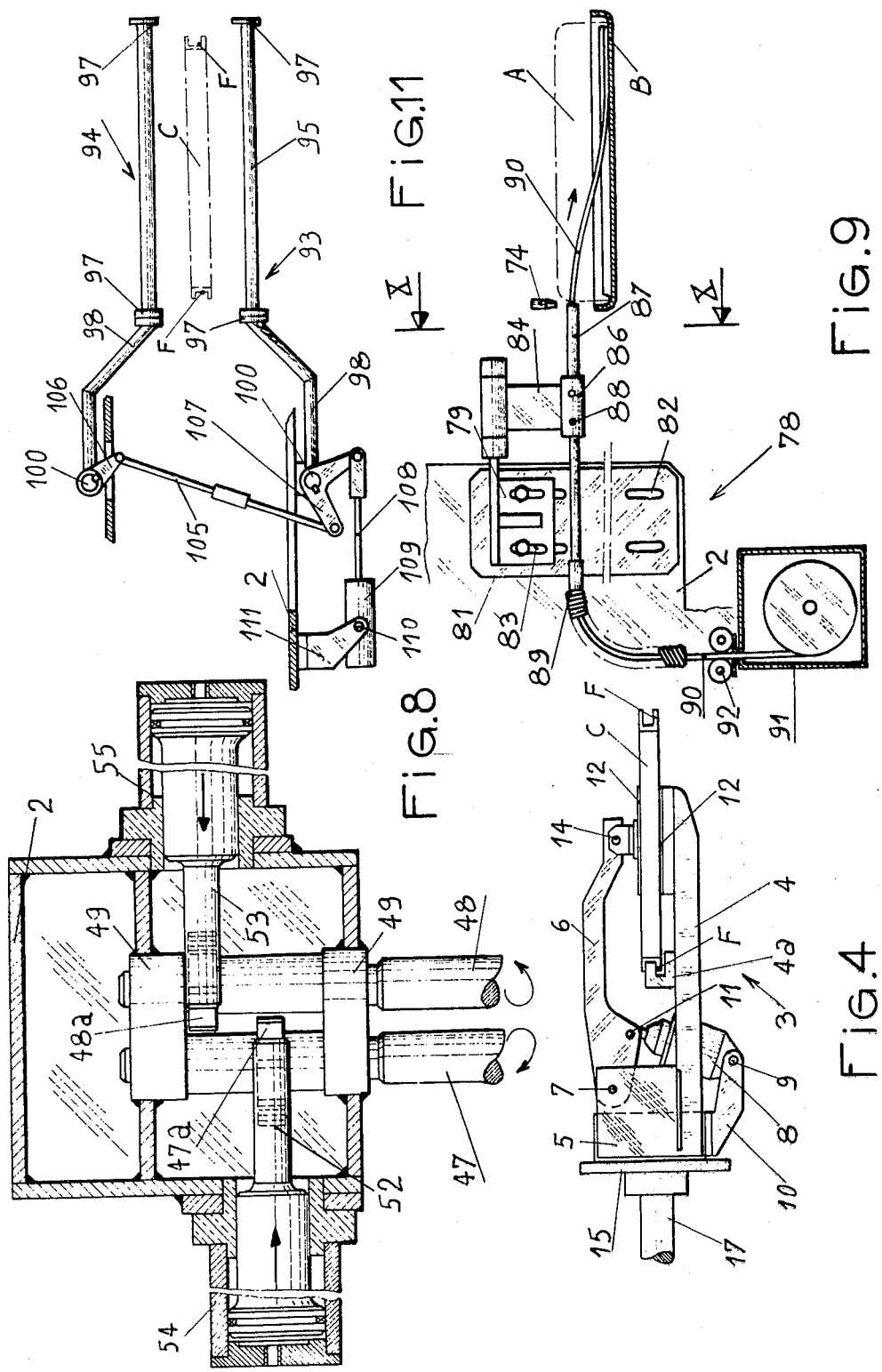

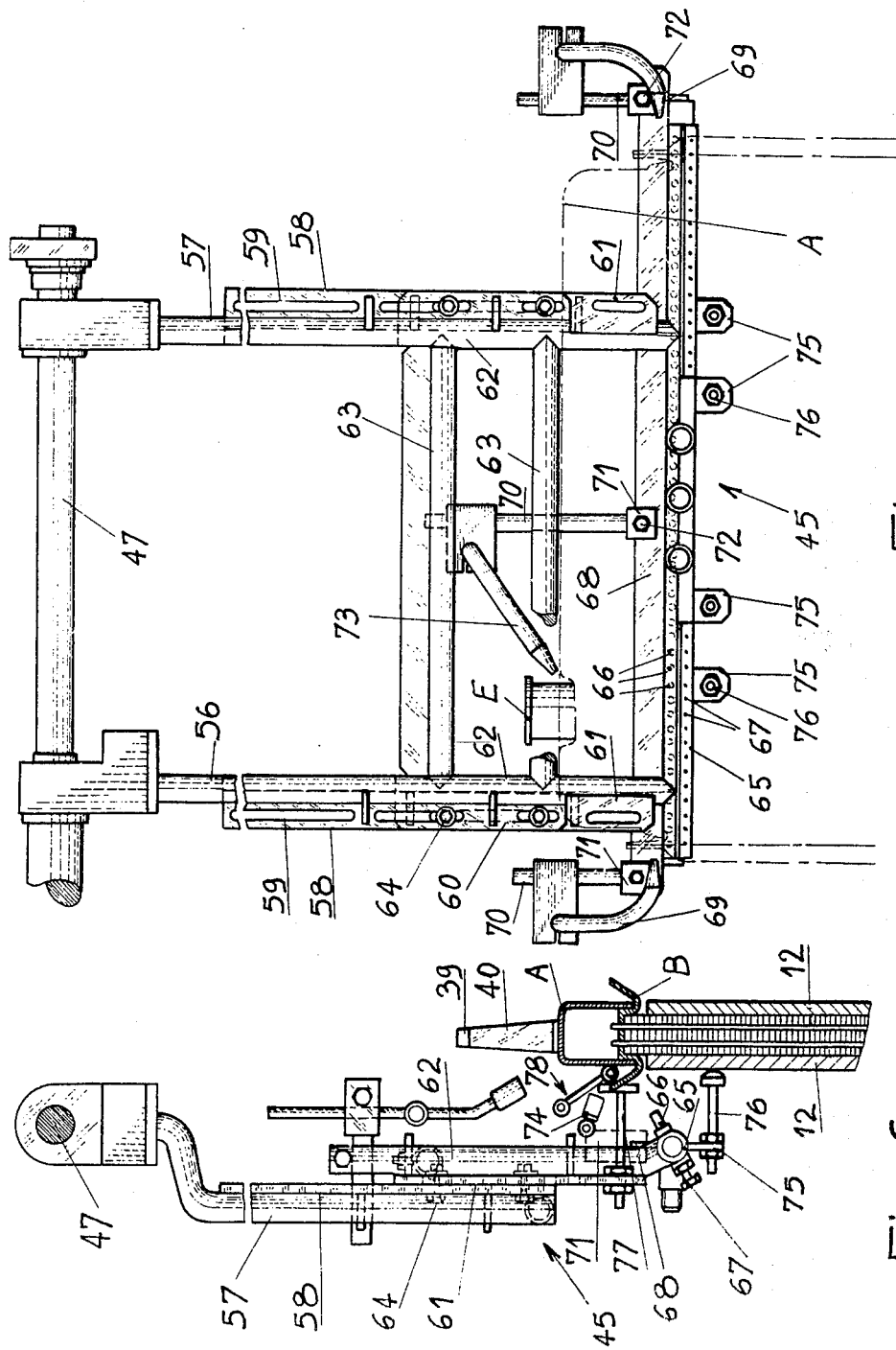

MACHINE FOR THE SUCCESSIVE WELDING OF TWO HEADER BOXES IN THE TWO END PLATES OF RADIATORS

The present invention relates to a machine enabling to automatically perform a welding of header boxes on end plates of the cooling or heating radiators typically used in the motor car industry.

The machine of the invention enables, further, in its working cycle to eventually also weld various additional components on the header boxes, especially filling bases, inlet and outlet tubes, and lugs of lateral flanges that radiators are provided with.

In the art of manufacturing radiators, welding of the header boxes on the end plates is performed at the end of the manufacturing cycle, i.e. after welding of the core, so-called, which means the welding of the tubes with the end plates and the welding of the tubes with the heat disturbers constituted by fins slipped on the tubes or by corrugated strips inserted between said tubes.

For welding the header boxes on the end plates it is very important that the core which has already been manufactured be not damaged. Yet, it is constituted of very fragile parts and it is important also that the welding to be performed does not have any chance to damage the already existing welds.

The problem is still more complicated in that it is essential to be able to work in succession radiators of various types having noticeable differences as to heights and widths and also in shapes and arrangements. In fact, it is well known that a radiator can have an end plate which is more or less wide for a given core thickness, moreover a header box can comprise various components such as filling bases, inlet and outlet tubes placed at different places, and the lateral flanges of the radiator can have to be welded on the smaller sides of the end plate or still on the top of the header boxes.

Yet, the invention solves completely the above stated problem and practically without any manual handling during the working cycle of the machine.

According to the invention, the machine comprises:
a frame,
a rotating gripper supported by said frame and comprising two arms, one of which being mobile, said two arms being provided with removable plates of a length corresponding to the distance between the end plates of each radiator to be machined, to constitute through their ends, bearing surfaces for said end plates,
a pressing element controlled in time relation with the rotation of the gripper to exert a pressure successively on each of said header boxes by maintaining them applied against the corresponding end plate retained by the removable plates of the gripper, and
two heating units, respectively placed on parallel rotating shafts and comprising burner heads connected to said shafts through sliding supports, whereby said burner heads are adjustable in position as a function of the radiator to be machined.

Various other features of the invention are moreover shown in the following detailed description.

An embodiment of the invention is shown by way of non-restrictive example in the accompanying drawings, in which:

FIG. 2 is a diagrammatic side view taken on line II—II of FIG. 1.

FIG. 3 is an enlarged elevation view taken substantially on line III—III of FIG. 1.

FIG. 4 is an elevation view of a detail of realization substantially taken on line IV—IV of FIG. 1.

FIG. 6 is a partly sectional elevation view illustrating a realization of one of the heating ramps of the machine shown in FIG. 1.

FIG. 7 is an elevation view corresponding to FIG. 6 after a rotation of 90°.

FIG. 8 is an enlarged cross sectional view taken along line VIII—VIII of FIG. 1 and showing the control mechanism of the heating ramps of FIGS. 6 and 7.

FIG. 9 is a diagram of a mechanism for bringing a welding wire to the machine.

FIG. 11 is a diagram of the cooling mechanism of the machine of FIG. 1 taken on line XI—XI.

Figure 1:
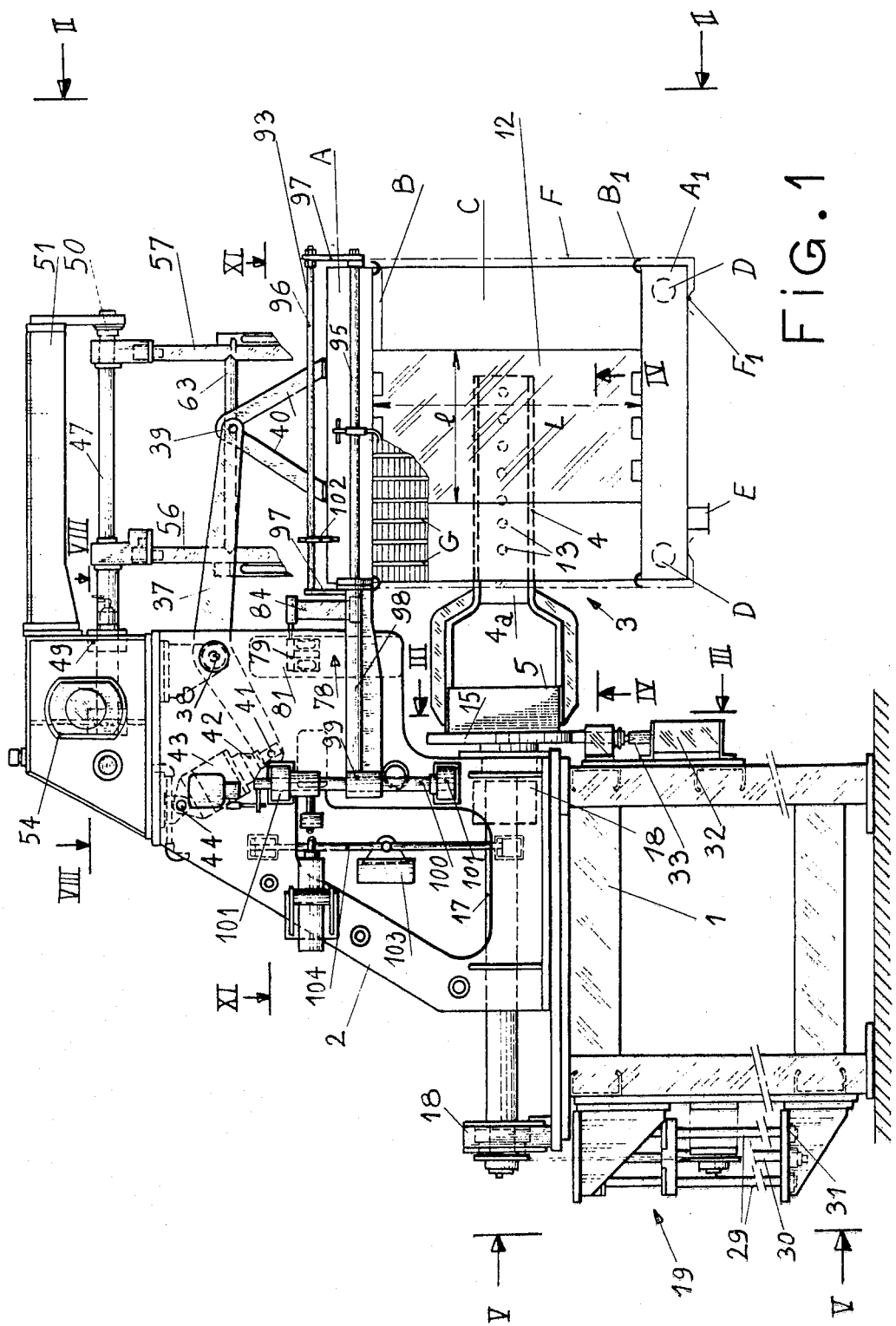
FIG. 1 is a partly diagrammatical elevation view of the welding machine of the invention.

The machine represented in the drawings is designed to realize a welding of header boxes A, $A_1$ on the end plates B, $B_1$ of radiators C and also a welding of the various components provided on the header boxes A or $A_1$, for example tubes D, filling bases E, end lugs $F_1$ of flanges F, etc..

The machine comprises a table generally designated by 1 on which is placed a frame designated by 2.

To support the radiator core, the machine comprises a gripper generally designated by 3. The gripper 3 is represented in FIGS. 1, 2 and 4 and comprises a "fixed" arm 4 provided with an axially adjustable abutment 4a. The arm 4 protrudes from a hub 5 to which said arm is rigidly fixed. The gripper 3 also comprises a "mobile" arm 6 which is pivotally mounted through a pin 7 (FIG. 4) on the hub 5.

A pneumatic or hydraulic jack 8 is pivotally mounted through a pin 9 on a lug 10 supported by the hub 5 and by a pin 11 on the mobile arm 6.

The fixed and mobile arms 4 and 6 of the gripper 3 each supports respectively a plate 12 fixed to each of them by removable elements, for example pins or bolts 13 to be interchangeable. The plates 12 are provided for a given type of radiator to be worked by the machine and thus constitute a kind of jigs. The width 1 (FIG. 1) of the plates 12 can be any one, but their length L corresponds, or so, to the interval between the end plates B, $B_1$ of the type of core to be machined.

FIG. 2 shows that the plates 12 have a length designed to be just smaller than the interval between the end plates B and $B_1$ in order that on one hand, the radiators C be easily placed without any risk of damaging the end plates upon tightening the gripper 3 and, on the other hand, to enable a small sliding of said radiators C upon the first working step, as described below. Said small sliding has for its result to bring the end plate, in which one of the header boxes is to be welded, in contact with one of the ends of the plates 12 which are thus designed to support directly the end plate having to be machined, without any stresses be transmitted to tubes G of the radiators C and, still more especially, to the portion of the tubes which have been previously fixed to said end plates B and $B_1$.

The tightening pressure produced by the jack 8 is also designed, while taking into consideration the surface of the plates 12, so that the pressure applied by said plates on both sides of the radiator C will not damage it. For that purpose also, that part of the plates 12 which is supported by the mobile arm 6 is connected to the same by a hinge 14.

The hub 5 which supports all the above described gripper 3 is rigidly connected to a marking disk 15 having slots 16, for example in the number of four, and both said disk 15 and the hub 5 are fixed at the end of a shaft 17 mounted in bearings 18 which are themselves fixed on the table 1.

The shaft 17 is connected to a control mechanism generally shown at 19 (FIGS. 1 and 5) which controls rotation of the hub 5, firstly in a first direction through 90° from the rest position of the gripper 3, then in the opposite direction through 180° from the last above position.

Figure 5:
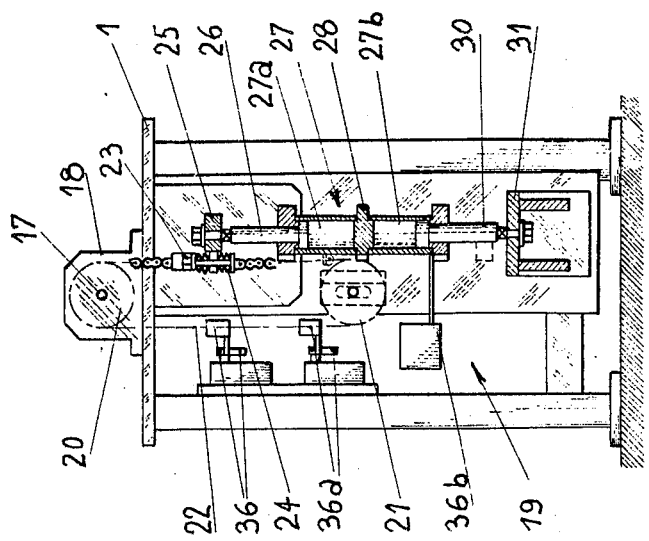
FIG. 5 is a partly sectional diagrammatic elevation view taken on line V—V of FIG. 1.

The control mechanism 19 is, for example, constituted as represented in FIGS. 1 and 5 in which it comprises a sprocket-wheel 20 wedged on the shaft 17 and a free sprocket-wheel 21 on which is mounted a chain 22 of which one segment placed between the two wheels 20, 21 is constituted by a connecting rod 23 on which are placed resilient washers 24 between which is fixed a finger 25 placed at the end of the piston 26 of a jack 27 having a body comprising two cylinders 27a, 27b separated by a diaphragm 28 which is axially guided by columns 29 (FIG. 1).

The cylinder 27b contains a piston 30 of which the end is fixed to a bracket 31 which is itself rigidly connected to the table 1.

In the position represented in FIG. 5, the pistons 26 and 30 are in a position for which the gripper 3 has been rotated through 90° with respect to the rest or loading position and, consequently, they are in the first working position for which the header box A has to be welded on the end plate B. By controlling the jack 27a so that the piston 26 be brought against the diaphragm 28, the chain 22 is moved a magnitude which corresponds to a first rotation through 90° of the shaft 17 which brings back the gripper 3 in the rest or loading position. By also controlling the piston 30 so that it be brought against the diaphragm 28, the chain 22 is moved a new magnitude causing the shaft 17 to rotate in the same direction, also through 90° and, consequently the second working position is reached, in which the end plate $B_1$ and the header box $A_1$ will have to be worked.

In order that the rest and work positions, successively occupied by the gripper 3, be perfectly accurate, the table 1 supports a locking jack 32 of which the piston 33 comprises a finger 34 (FIG. 3) entering one of the notches 16 of the marking disk 15, said notches 16 being made at 90° from each other.

FIG. 3 shows that the movements of the piston 33 of the locking jack 32 are controlled by relays 35, 35a, the position of which enables to know the locked or unlocked position of the marking disk 15.

Similarly, the position of the chain 22 driving the shaft 17 is controlled by means of relays 36, 36a supported by the table 1 and it is the same with regard to the position of the body of the jack 27 which is controlled by a relay 36b, which determines the rest and work positions of the gripper 3 by making possible to control, depending on the information thus furnished, the various working operations which are described hereinbelow.

During the successive welding operations of the header boxes A and $A_1$, they must be held firmly applied against the corresponding end plate with which they have to be welded and, for that purpose, the frame 2 supports a rotating lever 37 (FIG. 1) which is hinged about a pin 38. At one end, the lever 37 supports, through a pin 39, a pressing part 40. At the other end thereof, the lever 37 is hinged through a pin 47 to the piston 42 of a jack 43 which is itself hinged through a pin 44 on the frame 2.

The jack 43 is calibrated to always exert a constant force on the header boxes A through the lever 37 and tightening part 40. For practical reasons the stroke of jack 43 has to be small and if possible substantially constant for all types of radiators C having to be machined, and the part 40 is placed, according to an easily removable way, on the lever 37 to be changed while thus constituting an equipment or a jig special to each type of radiator in the same way as the above described plate 12.

To perform the weldings which have to be made all around the end plates when they are in the position of the end plate B of FIG. 1, the machine comprises, as shown in FIG. 2, heating units, respectively shown at 45 and 46 and which are supported by the shafts 47, and respectively 48. Said shafts are supported in bearings 49 and 50 (FIG. 1) respectively placed at the higher portion of the frame 2 and at the end of a cross-piece 51 formed by this frame.

FIG. 2 shows that heating units 45, 46 can occupy two positions, a working position for which they are represented in full line, and a rest position for which they are represented in phantom line. These two positions are controlled by shafts 47, 48 having a portion inside the frame 2 which supports pinions 47a, and respectively, 48a engaged with racks formed at the end of rods 52, 53 of jacks 54, 55 (FIG. 8).

Each heating unit 45, 46 comprises, as shown in FIGS. 6 and 7, arms 56, 57 for example constituted of tubes on which are fixed plates 58 on which are provided extended apertures 59 brought more or less in coincidence with similar apertures 60 of homologous plates 61 fixed to support-tubes 62 which are advantageously connected together by means of cross-bars 63.

Bolts 64, or other fixation components, are passed through the apertures 59 and 60 of the plates 58, 61 to ensure a fixation of the support-tubes 62 in a way adjustable in height to take into consideration the position of the end plates B and header boxes A of a particular type of radiator. Thus the arms 56, 57 constitute, so-to-speak, telescopic elements.

At the lower portion thereof, the support-tubes 62 are connected to a head 65 of burners provided, on its side facing the end plate B, with burner nozzles 66. The length of the burner head 65 is selected to correspond to the type of end plate B the longest having to be worked by the machine and each nozzle 66 is controlled by a valve 67 constituted, for example, by a punch-screw which enables to inactivate some of the nozzles 66 when the machine works on end plates of a smaller length than the maximal possible length.

The burner head 65 supports, on its top, a longitudinal small bar 68 forming a support for various additional components, especially for placing end burners 69 designed to heat the smaller sides of the end plates and of the header boxes, said burners having a support 70 provided at its lower portion with a stirrup 71 covering the small bar 68. A locking screw 72 is designed to lock the support 70 on said small bar 68.

The drawings show that each heating unit 45, 46 can be provided with further burners such as that shown at 73 for heating the additional components, such as bases E or tubes D, having to be welded on the header box.

The small bar 68 supports also at least one cutting burner 74 (FIG. 6) whose function will be given below.

It is noted from the above disclosure that each heating unit 45, 46 can easily be arranged to correspond to a particular type of radiator to be machined since there is only to suitably adjust the height of the burner head 65, then open or close a more or less important number of nozzles 66, and then place on each small bar 68, at suitable places, the various mobile burners such as 69, 73, and 74, and any other burners which would become necessary for particular operations to be made on a given type of radiator.

The support-tubes 62 are provided, at their lower portion, with lugs 75 which are, for example, welded beneath the burner head 65, these lugs being provided with adjustable abutments 76.

FIGS. 2 and 6 show that the abutments 76 are designed to come and bear against the plates 12 of the gripper 3 when the heating units are taken down in working position, which enables — the jacks 54–55 controlling the shafts 47–48 being maintained under pressure — to be sure that the burners, especially the nozzles 66, are exactly at a suitable distance from the portions of the parts to be heated which prevents also that stresses be directly applied to the parts of the radiator C during the working process.

Figure 10:
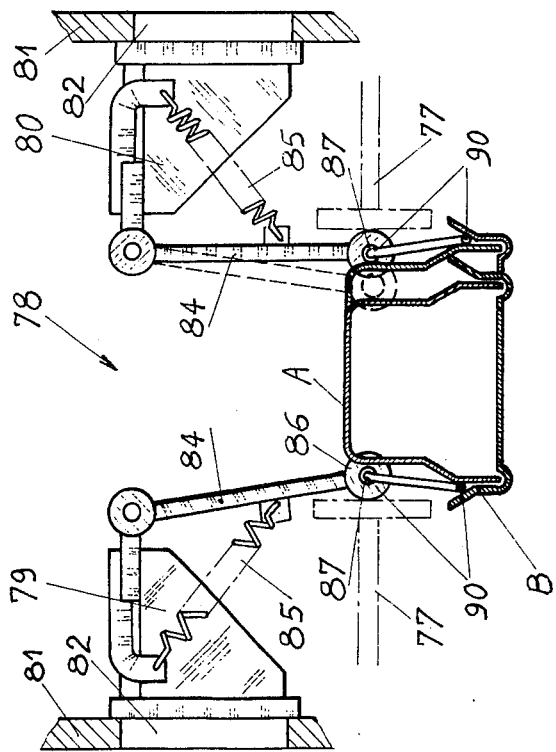
FIG. 10 is an enlarged diagrammatic sectional view taken substantially along line X—X of FIG. 9.

The support-tubes 62 are also provided with auxiliary adjustable abutments 77 constituted in the same way as the abutments 76 and which are designed for controlling the devices feeding the welding wire 78, shown in detail in FIGS. 1, 9 and 10. These devices, which are carried by the frame 2, are in the represented example, in the number of two and placed on each side of the position to be occupied by each radiator C when it is machined. For that purpose, the frame 2 supports brackets 79 — 80, whose position is adjustable in height, along supports 81 with extended slots 82 in the same way as the brackets 79, as shown at 83 in FIG. 9.

Brackets 79–80 each supports a small rod 84 urged by springs 85 tending always to bring back said small rods 84 in a retracted position to make possible a rotation of the radiators C when they are not in a working position.

The free end of each small rod 84 comprises a sleeve 86 into which is passed a guiding tube 87 which is axially adjustable relative to the sleeve 86 into which it can be blocked, for example by means of punch-screws 88.

It is noted from the above disclosure that the tube 87 can be adjusted both in height, by acting on the position of the brackets 79–80, and axially, by sliding it in the sleeve 86 and placing it in a position which would be appropriate to the position and to the length of the header box and end plate of a particular type of radiator.

The tube 87 is connected to a flexible pipe 89 through which is brought a welding wire 90 coming from a distributing device 91 of which the controlling element, for example rollers 92, is operated to deliver, at each time, a length of welding wire 90 corresponding to the type of radiator under work. Such distributing devices being well known in the art have not to be described in more detail.

The operation of the small rods 84 to bring them in the position represented in FIG. 10, by stretching the springs 85, is caused at the moment of the going down of the heating units 45, 46 of which the auxiliary abutments 77 push said small rod as illustrated in FIG. 10. The auxiliary abutments being adjustable, and also the abutments 76 which bear against the plates 12, there is thus obtained automatically an accurate position for the tubes 87, whatever the width of the end plates B of the header boxes A may be, since said abutments 76 are previously set to take said width into consideration.

Besides the elements described in the above disclosure, the machine comprises also cooling units 93–94 (FIG. 1 and 11). Each cooling unit comprises a blowing head 95 and a small bar 96 (FIG. 1) connected to the blowing head 95 for example by means of lugs 97. These blowing units are respectively mounted at one end of arm 98 of which the other end is provided with a sleeve 99 which can be wedged in any point of the shafts 100 which are vertically placed in bearings 101 of the frame 2. Thus, the cooling units 93–94 can be placed at a suitable height relative to end plate B and header box A.

The blowing head 95 of each unit is fed, by any appropriate means, in cooling compressed air and the compressed air can also be brought to water sprayers 102 which can slide at will along each small bar 96. The feeding in water of said sprayers 102 is ensured from a tank having a constant level 103 adjustable in height along a vertical rod 104 also placed in the frame 2.

The water sprayers 102 are particularly provided to ensure a very strong cooling, through a mist, of some previously welded portions, particularly the ends of the lateral flanges $F_1$ when they bear on the top of the header boxes A, as well as an accelerated cooling of the filling bases E, etc...

The shafts 100, which support the two cooling units 93–94, are connected together by means of a rod 105 (FIG. 11), the ends of which are respectively pivotally mounted on a crank 106 fixed with one of the shafts 100 and on a rocker-arm 107 fixed with the other shaft 100. The rocker-arm 107 is moreover connected to the rod 108 of a jack 109 hinged by a pin 110 on a support 111 of the frame 2. Controlling the jack 109 makes possible either to hold the cooling units 93–94 in the position represented in FIG. 11, i.e. parallel with the radiator C, or to separate said cooling units according to arrows shown in FIG. 11 for them to occupy the position in which they are in FIG. 2 and for which they enable the motion of the heating units 45–46.

The above described machine operates in the following way:

At a rest position, the shaft 17 has been brought by the jack rod 26 in a position for which the gripper 3 is horizontally disposed.

In said position:

the gripper is now blocked by the disk 15 in one of the notches 16 in which enters the finger 34, the jack 43 has been operated and the lever 37 rotates to lift the pressing component 40, the jack 8 controlling the mobile arm 6 of the gripper 3 has also been operated to lift said arm 6, The jacks 54 and 55 controlling the rotation of the heating units 45, 46 hold the same in the elevated position, which is that represented in phantom lines in FIG. 2. Consequently, the small rods 84 supporting the tubes for guiding the wire 87 are also lifted by the springs 85, which is provided by the soft constitution of the tubes 89 bringing the welding wire 90 to the distributing tube 87, the jack 109 controlling the shafts 100 is in a position for which the cooling units 93–94 are in a separated position, which is that represented in FIG. 2.

The operator in charge of the machine then brings - on the plate 12 of the fixed arm 4 of the gripper 3 — a radiator C, preferably already provided with its water boxes A – $A_1$ and eventually with some further components: base, tubes, etc.. held in position by temporary crimpings or other means known in the art. The radiator is placed so that one of its flanges F will come against the abutment 4a (FIG. 4). The radiator is thus transversally centered by said abutment 4a and longitudinally by the plate 12, the ends of which are in the vicinity of the two end plates B –$B_1$.

The working operations are then proceeded according to the following sequence:

the jack 8 is operated and causes the motion of the mobile arm 6 of the gripper 3 of which the plate 12 grips the radiator C, but gently against the plate 12 of the arm 4. The end of this operation is controlled through a relay which causes operation of the jack 32 of which the rod 33 puts down the locking finger 16 of the disk 15. At the end of the stroke, the relay 35 is operated, which causes operation of the jack 27a making the shaft 17 to rotate for example in the counter-clockwise direction, and thus the gripper 3 brings the radiator in the position represented in full line in FIGS. 1 and 2.

At the end of the stroke, a relay, for example the relay 36, is operated by the chain 22, which causes a new operation of the jack 32, the finger 16 controlled by the rod 33 thereof entering a new notch of the disk 15 which locks the gripper 3.

If the header box A has not yet been placed, as above explained, then it is placed by the operator at that very moment; but it is prefered that the header box be already placed to prevent stoppage of the automatic cycle of the machine. Actually:

the last stroke of the jack 32 has operated the relay 35a (FIG. 3) which causes the feeding of the jack 43 operating the lever 37 (FIG. 1); thus the pressing element 40 bears on the top of the header box A maintaining the same applied into the end plate B. Said motion has eventually caused the radiator C to very slightly slide between the plates 12 for the top of the same to bear beneath the end plate B;

the end of the above motion of the pressing element 40 controls, through a relay, the jacks 54–55 operating the shafts 47–48 bringing the heating units 45–46 in their working position. The going down motion of the heating units 45–46 causes rotation of the rods 84 of the wire bringing devices, through the auxiliary abutments 77.

An end-of-stroke relay, or a temporized relay, then operates the distributing device 92, whereby a suitable length of welding wire 90 is brought through the flexible tube 89 and through the distributing tube 87 to come in the position illustrated in FIG. 9.

At the end of this operation, the cutting burner 74, which was turned low, is supplied at full power for example by an appropriate electrovalve, thus the wire 90 is cut and completely housed between the end plate and the header box as shown in FIG. 10. Simultaneously, or with a slight time delay, the burner-heads 65 are operated, and also the auxiliary burners such as 69, having to heat the small sides of the end plate, and 73 for heating the additional components to be welded on the water box, said additional components having been provided, upon positioning with a welding alloy band or having previously been covered with welding alloy.

The heating time is controlled by a relay or a clock which controls, after a period appropriate to the work in question, operation of the jacks 54–55 causing the heating units 45–46 to raise up.

A little time before the raise of the heating units 45–46 or upon end of said raise, the jack 109 (FIG. 11) operating the cooling heads 93 and 95 is fed and said heads are brought in the position represented in FIG. 11 through a rotation around the shafts 100. Blowing of air and spraying of water mist by the sprayers 102 very quickly causes the welding alloy to become coagulated and cool, and after an appropriate period of time, the jack 109 is again fed but in the opposite direction to bring the cooling heads in the position shown in FIG. 2. The return to said position of the cooling heads 93–94 controls again the jack 32 which unlocks the disk 15.

The new unlocking of the disk 15 controls the jacks 27a and 27b which drive the chain 22 in making the shaft 17 to rotate through 180° in the clockwise direction.

At the end of said motion, the jack 32, which is again controlled, stops the gripper 3 in the new position for which the end plate $B_1$ and the water box $A_1$ are in the welding position. Then the same sequence of operations as above described in caused to start.

Lastly, the jack 27a brings back the gripper 3 in its initial position, through a new rotation of 90° in the counter-clockwise direction. The jack 8 is operated to lift the mobile arm 6 of the gripper 3, and the finished radiator is removed.

The invention is not restricted to the embodiment shown and described in detail, for various modifications thereof can moreover be applied thereto without departing from the scope of the invention as shown in the appended claims.

I claim:

1. A machine for the successive welding of two header boxes in two end plates of different sized radiators, comprising:
    a frame;
    a rotating gripper supported by said frame and comprising two arms, namely a fixed arm and a mobile arm, said two arms being provided with removable plates of a length corresponding to the distance between the end plates of each radiator to be machined to constitute, by end portions thereof, bearing surfaces for said end plates;
    a pressing element, controlled in time relation with the rotation of the gripper, to exert a pressure successively on each of the header boxes by maintaining them against the corresponding end plate held by the removable plates of the gripper; and
    two heating units respectively placed on parallel rotating shafts and comprising burner heads connected to said shafts through sliding supports, whereby said burner heads are adjustable in position as a function of the radiator to be machined.

2. Machine as set forth in claim 1, wherein the heating units are provided witth adjustable abutments bearing against the lateral sides of the removable plates for holding the radiator when the shafts controlling said heating units are rotated to bring said units in working position.

3. Machine as set forth in claim 1, wherein each burner head extends on a length corresponding to the longest radiator to be machined and comprises individually adjustable burners, whereby each head is adapted to the length of the end plate of each type of radiator to be machined.

4. Machine as set forth in claim 1, wherein each burner head comprises a small longitudinal bar for placing supporting stirrups for auxiliary burners particularly designed for welding of additional components provided on the header boxes of the radiators to be machined.

5. Machine as set forth in claim 1, including welding wire distributing devices, wherein the heating units comprise auxiliary abutments for operating rotating rods connected to return-springs and supporting a tube for feeding a welding wire coming from said distributing devices, whereby said tube is thus in line with each end plate edge at the end of a rotation stroke of the heating units.

6. Machine as set forth in claim 5, wherein the tube feeding the welding wire is axially adjustable relative to the rod which carries it and is connected to the distributing devices through a flexible tube, whereby the end of said feeding tube is adjustable to come in coincidence with an end portion of the end plate whatever the type of the machined radiator may be.

7. Machine as set forth in claim 5, wherein each heating unit comprises a cutting burner directed towards the end of the tube feeding the welding wire to ensure melting of said welding wire at the opening position of said feeding tube.

8. Machine as set forth in claim 1, further comprising cooling units with air blowing heads placed on shafts in the frame and connected together and to a control mechanism to ensure rotation thereof by separating or uniting said cooling heads from the radiator to be machined in synchronism with the motion of the heating units.

9. Machine as set forth in claim 8, wherein the heads of the cooling units are supported by arms connected through sliding sleeves on the shafts controlling rotation of said cooling units, said shafts being placed upwardly in the frame, whereby position of the cooling units is adjustable depending on the height of the radiators to be machined.

10. Machine as set forth in claim 8, wherein each cooling head comprises small axial bars for placing water sprayers fed with compressed air at same time as said heads and with spraying water from a constant level tank slidably mounted on a vertical rod carried by the frame, whereby said tank is adjustable depending on the height of the radiators to be machined.

11. Machine as set forth in claim 1, wherein the rotating gripper supporting the radiators comprises on its fixed arm an adjustable abutment ensuring a transverse centering of the radiator upon placing thereof, while longitudinal centering is ensured by the plate of said gripper which extends between the two end plates of said radiator.

12. Machine as set forth in claim 1, wherein the rotating gripper is controlled by a shaft connected through a transmission to a double body jack, the length of each body of said jack being so selected to have a working stroke causing rotation through 90° of said shaft and gripper, whereby said gripper rotates in a given direction through 90° with respect of original position and then in a reverse direction through 180° with respect to position reached upon the first rotation, resulting therefrom that the radiator is put flat on the gripper, then brought in its first vertical position, and lastly brought in a second vertical position after the rotation through 180° preceeding a return to the original position.

13. Machine as set forth in claim 1, wherein the shaft controlling the rotation of the gripper is provided with a notched disk having notches corresponding to the various positions that must occupy the gripper, and cooperating with a locking finger formed at the end of the rod of a jack.

14. Machine as set forth in claim 1, wherein the successive machining operations are controlled by end-of-stroke relays respectively operated at the end of a preceeding machining operation.

* * * * *